US008065059B2

(12) United States Patent
Oezaslan et al.

(10) Patent No.: US 8,065,059 B2
(45) Date of Patent: Nov. 22, 2011

(54) DEVICE FOR THE SEMIAUTONOMOUS SUPPORT OF THE PARKING PROCESS OF A VEHICLE

(75) Inventors: Hakan Oezaslan, Ludwigsburg (DE); Marcus Schneider, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 387 days.

(21) Appl. No.: 12/291,924

(22) Filed: Nov. 14, 2008

(65) Prior Publication Data

US 2009/0164066 A1    Jun. 25, 2009

(30) Foreign Application Priority Data

Dec. 21, 2007   (DE) .................. 10 2007 062 244

(51) Int. Cl.
    *B62D 6/00* (2006.01)
(52) U.S. Cl. ...................... 701/41; 340/932.2
(58) Field of Classification Search .............. 701/41, 701/300, 1; 340/932.2, 425.5; 180/444, 180/446, 443, 419, 104, 402, 410, 411; 280/89.11
    See application file for complete search history.

(56) References Cited

U.S. PATENT DOCUMENTS

| 7,786,896 | B2 * | 8/2010 | Schmid et al. ............ 340/932.2 |
| 2005/0263971 | A1 | 12/2005 | Turner et al. | |
| 2008/0177443 | A1 * | 7/2008 | Lee et al. ..................... 701/41 |
| 2008/0266137 | A1 * | 10/2008 | Son ............................. 340/932.2 |

FOREIGN PATENT DOCUMENTS

| DE | 101 36 410 | 2/2002 |
| DE | 10337842 | 1/2005 |
| DE | 102005/008176 | 8/2006 |
| EP | 0 448 059 | 9/1991 |
| JP | 62-166164 | 7/1987 |
| JP | 62255277 A * | 11/1987 |
| JP | 10236328 A * | 9/1998 |
| JP | 2000052997 A * | 2/2000 |
| WO | WO 2006/103030 | 10/2006 |

* cited by examiner

Primary Examiner — Thomas Black
Assistant Examiner — Marthe Marc-Coleman
(74) Attorney, Agent, or Firm — Kenyon & Kenyon LLP

(57) ABSTRACT

A device for the semiautonomous support of a parking process of a vehicle, such as a motor vehicle, having a steering device for the steering movement of wheels of the vehicle, having a control device for controlling the steering device, the control device having a computing device for processing input values to form an output value that controls the steering device; the computing device being developed for processing a steering angle, that is maximally achievable at the wheels of the vehicle, together with a steering wheel angle, that is maximally achievable in response to the respective conditions, to form an output value that is designated as a steering wheel angle.

11 Claims, 5 Drawing Sheets

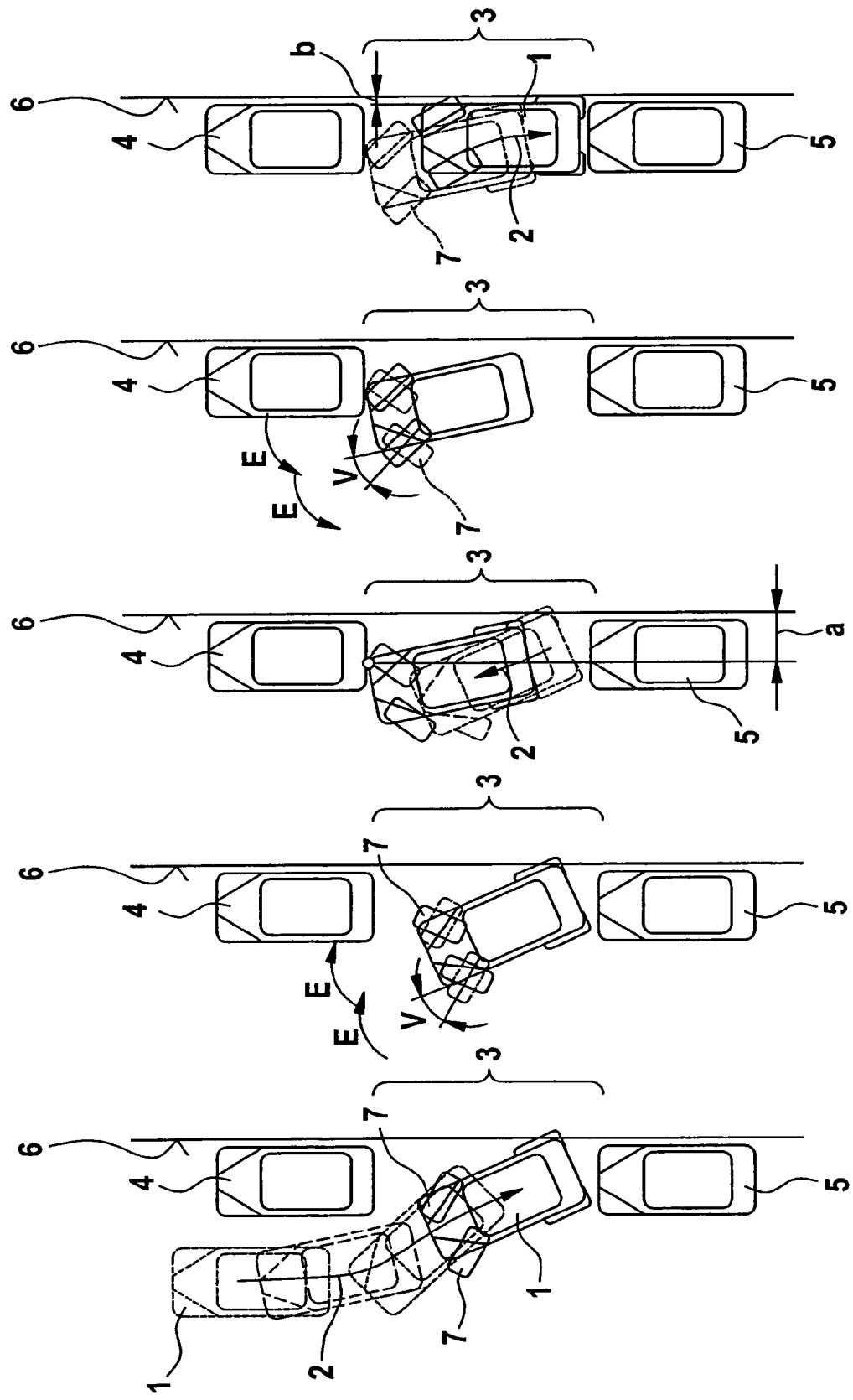

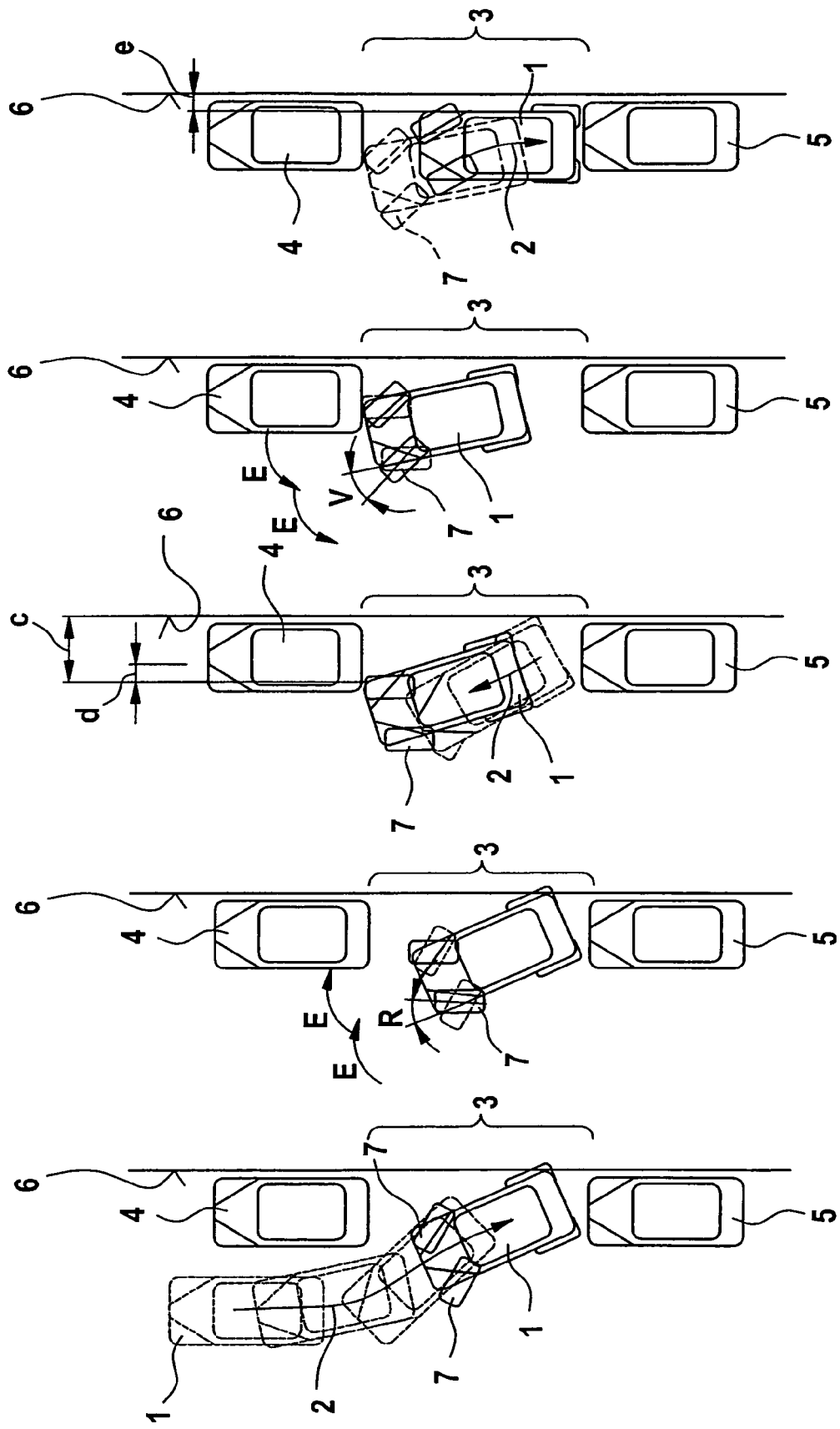

DEVICE FOR THE SEMIAUTONOMOUS SUPPORT OF THE PARKING PROCESS OF A VEHICLE

CROSS REFERENCE

The present application claims the benefit under 35 U.S.C. §119 of German Patent No. 102007062244.0 filed on Dec. 21, 2007, which is expressly incorporated herein by reference in its entirety.

FIELD OF THE INVENTION

The present invention relates to a device for the semiautonomous support of a parking process of a vehicle, such as a motor vehicle, having a steering device for the steered movement of wheels of the vehicle, and a control device for controlling the steering device, the steering device having a calculating device for processing input values into an output value that controls the steering device.

BACKGROUND INFORMATION

A device for the semiautonomous support of a parking process for vehicles is described in German Patent Application No. DE 10 2005 008 176 A1.

In contrast to fully autonomous devices for the support of parking processes, in the case of semiautonomous devices, that is devices which make available support power semiautonomously during the parking of vehicles, the cooperation of a driver is relied upon. In the case of devices for semiautonomous support of a parking process, the driver generally at least either accelerates and brakes, or intervenes in the parking process by steering. In contrast to these devices that operate semiautonomously, in the case of fully autonomous devices, that is, devices which put together fully autonomous support power during the parking process, neither steering not braking and/or giving gas is expected of the driver.

Furthermore, in the case of devices which autonomously support the parking process of vehicles, intervention is only conditionally possible.

Devices for the semiautonomous support of a parking process are used in land-bound vehicles, especially in motor vehicles equipped with an internal combustion engine, such as passenger cars.

German Patent Application No. DE 10 2005 008 176 A1 describes an arrangement for automatic steering that superposes steering torque on the steering wheel of the vehicle that is to be parked. If the steering torque is greater than the frictional forces between tires and roadway, the vehicle is automatically steered. However, the driver controls the steering wheel motion of the vehicle independently. The device described in German Patent Application No. DE 10 2005 008 176 A1 for the semiautonomous support of a parking process does not intervene independently in the control of the steering wheel motion of the vehicle. However, using sensors mounted on the outside of the vehicle, it measures the parking space and also ascertains a desired entry trajectory. The entry trajectory is the curve that is covered optimally by the vehicle during parking.

German Patent Application No. DE 10 2005 008 176 A1 also describes an arrangement held in reserve which ascertains the maximum possible steering speed. It also describes that an arrangement is held in reserve which determines the steering speed, that is, the speed for the application of steering torque to a steering wheel and/or a steering shaft via appropriate assemblies. In this context, an adjustment is produced in a computing device between the calculated steering speed and the maximum possible steering speed. If the calculated steering speed is greater than the maximum possible steering speed which is able to apply the means for automatic steering, either an instruction is output to the driver to lower the speed, or the speed is automatically reduced via a limiting device.

If, during parking of the vehicle and being aided by the semiautonomously working device, the driver does not operate the steering wheel, the steering torque required for controlling the steering wheel is applied exclusively by a steering device, that is, a steering actuator device, such as an electric motor. Such electric motors are part of appropriate steering devices that are also known as EPS, i.e., electronic power steering.

However, for large steering angles, large steering torque generally has to be applied, particularly when the vehicle to be parked is at a standstill. High currents are then required of the steering device, which may amount, at times, up to 100 Amps. In such high-load situations, diverse problems appear in the conventional devices. For instance, the conventional devices are not able to park the vehicle that is to be parked in one reverse move, but require at least one additional forward move. This problem occurs particularly in small parking spaces. In such cases, if one wants to achieve a low longitudinal distance from a lateral limitation, such as a curb, each change in direction is accompanied by a maximum steering angle. To be sure, in a case like that the vehicle is usually standing still, while the steering device is instructed to execute a maximum steering angle.

Mechanical steering systems used up to now have unfavorable force transmission, particularly in the case of large steering angles, so that particularly large steering torques have to be applied if a maximum steering angle is to be achieved.

The problems are aggravated if the pavement, on which the vehicle is located, and/or the tire quality used by the vehicle displays a particularly firm grip. It then sometimes becomes possible only to achieve a partial steering angle.

The problem is further aggravated if the battery supplying the steering device with current is weak, or if a steering assembly of the steering device detects a high thermal load, whereby the maximum deliverable steering torque is reduced. Even in such cases, the desired steering angle can no longer be fully implemented.

The maximum steering angle that can be achieved is therefore greatly different, even within a single parking process, and is not predictable in all cases.

SUMMARY

It is an object of the present invention to provide an effective device for the semiautonomous support of a parking process for a vehicle.

This object may be attained by providing a computing device for processing a steering angle maximally achievable at the wheels of the vehicle together with a steering wheel angle that is maximally achievable in response to the respective conditions in an output value designated as steering wheel angle and able to be supplied to the steering device.

A steering wheel angle is an angle which is applied at the steering wheel and/or the steering shaft by the steering device using steering torque, and which leads to an adjustment of the steering wheel and/or the steering shaft by a certain amount whereby an adjustment of the wheels is forced.

A steering angle is an angle which is present at the steerable wheels of a vehicle. The maximally achievable steering angle is present, in response to a maximum steering angle, in this instance. A maximum steering angle at the steering wheel does not necessarily lead to a maximum steering angle, that is, to a maximally achievable steering angle at the wheels, since there are degrees of freedom with respect to play, tolerances and torsions that have to be taken into account.

Because of the example embodiment of the device according to the present invention, the maximally achievable steering wheel angle is taken into account as is aimed for by the steering torque applied using the steering device. By the appropriate control of the steering device, it is achieved that, when the parking process is ended, the vehicle is positioned particularly close to a lateral limitation, and in an accurate manner in the parking space. The result is more precise parking. It is particularly possible, in this context, to take into account an actually maximally achievable steering angle, when making a calculation of the parking path.

If the control device for outputting the output value to the steering device, for setting the wheels in a first correction move and a subsequent second correction move is developed having the same steering wheel angle, preferably the same maximally achievable steering wheel angle, it is avoided that, after a first correction move, in which the steering angle achieved is smaller than the maximally achievable steering angle, in a subsequent second correction move, the vehicle is driven deeply enough into the parking space so that after a subsequent third correction move it comes to rest in parallel and as close as possible to a limitation, such as a curbstone edge.

The processing of the maximally achievable steering angle with the maximally achievable steering wheel angle is especially simple to achieve if the control device has a base data transmission device that supplies the value of the maximally achievable steering angle. The maximally achievable steering angle, in this instance, is either to be input manually into the base data transmission device or to be determined via sensors.

In one additional advantageous specific embodiment, the maximally achievable steering wheel angle is also supplied to the computing device in a particularly simple manner if the control device has a value ascertainment unit, that supplies the maximally achievable steering wheel angle.

If the value ascertainment device is developed for extrapolating the maximally achievable steering wheel angle, based on a steering wheel angle that is achievable within a certain time, then, even after an especially short time, information is available concerning the maximum achievable steering wheel angle. In this advantageous exemplary embodiment, in a very short time one is also able to calculate, in the computing device, the steering wheel angle that is to be set as the output value.

In a further exemplary embodiment, it may be advantageous if the value ascertainment device is designed to determine the maximally achievable steering wheel angle based on the oscillating behavior of the steering wheel angle. This advantageously takes place by using and evaluating a frequency analysis. With the aid of certain characteristics, such as the oscillation of the steering angle in a certain frequency range, having a certain amplitude, it may then be detected whether the steering has problems in achieving the final value. The maximally achievable steering wheel angle is ascertainable early, in this context.

In one additional specific embodiment it has also turned out to be particularly advantageous if the value ascertainment device is developed to determine the maximally achievable steering wheel angle, based on a maximally available steering support force and/or steering support power that is suppliable to a steering device. The usual power and/or force measuring devices may be used, in this context, as additional protection or as sole variant.

In order to achieve a particularly good adaptation to a limitation of the parking space, it is of advantage in one additional exemplary embodiment if the control device is developed for setting the steering wheel angle at the steering system during a third correction move, the steering wheel angle having a value that is less than or equal to the maximally achievable steering wheel angle.

If the computing device is developed to establish the maximally achievable steering wheel angle, after subtraction of a safety angle from the maximally achievable steering wheel angle, it is also assured that, in a subsequent correction move, a steering wheel angle is able to be selected that is not less than the steering wheel angle used in a preceding parking process. In this way, at least in two correction moves taking place directly one after the other, the same steering wheel angle may be selected, which leads to the symmetrical carrying out of the parking process.

In order to increase the precision of the parking process some more, it is advantageous in one additional specific embodiment if the control device is developed for establishing the number of moves as a function of a deviation of the maximally achievable steering wheel angle from the maximally achievable steering angle.

BRIEF DESCRIPTION OF THE DRAWINGS

Exemplary embodiments of the present invention are explained more fully with the aid of the figures.

FIGS. 1a to e show a sequence when running through an optimal parking process.

FIGS. 2a to e show the sequence during parking a vehicle in a usual parking process, in a first correction move the steering wheel angle not being selected to be equal to the maximally achievable steering wheel angle.

DETAILED DESCRIPTION OF EXAMPLE EMBODIMENTS

Figure 3D:
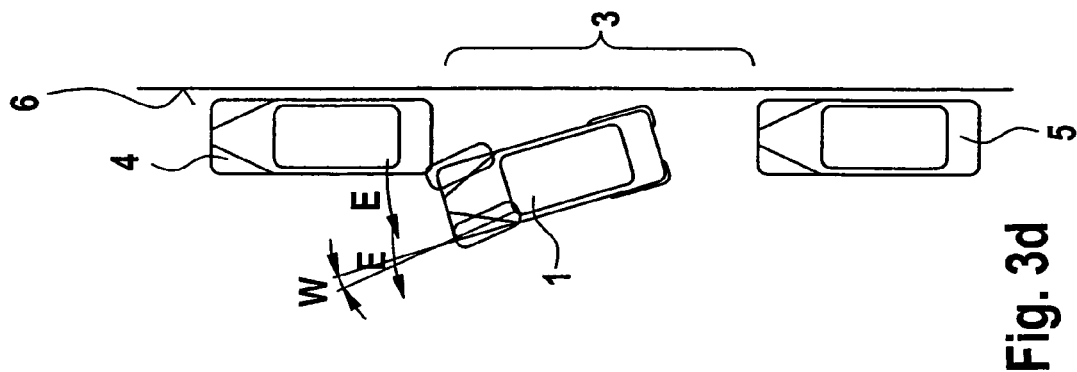
FIGS. 3a to g show parking while using the device according to an example embodiment of the present invention.

FIG. 1a shows a vehicle 1 at four different points in time, as it is parking on an entry trajectory 2 in a parking space 3 in a first correction move between a front vehicle 4 and a rear vehicle 5. At the initial point of parking, vehicle 1 is located on the side at which there is no lateral limitation 6. In the present exemplary embodiment, lateral limitation 6 is formed as curbstones. At the end of the first section of the parking process, vehicle 1 is included for the most part in parking space 3. Driving in was achieved by the steering operation of the wheels, particularly of front wheels 7. As it arrives in the parking space, vehicle 1 stops and redirects wheels 7 at a maximum steering angle (angle V) to the right. This is shown in FIG. 1b.

Thereafter, the vehicle is driven forward as far as possible, which is shown in FIG. 1c. Here too, the vehicle stops again, and wheels 7 are redirected to the left at the maximum steering angle. After that, (see FIG. 1e) the vehicle backs up again, so that it is subsequently located in a line with vehicles 4 and 5.

In FIGS. 1c and 1e, the original position of vehicle 1, that is relevant for the respective correction move, is shown by dashed lines. The direction of motion is shown by an arrow which denotes the drive-in trajectory relevant for this moment. FIGS. 1b and 1d show the alignment, changed according to the steering angle direction, of wheels 7 with arrows E. The maximum steering angle of wheels 7 is shown in each case by angle V for the left wheel.

Vehicle 1 has sensors which detect the approach to objects located outside the vehicle, in the present case, lateral limitation 6, front vehicle 4 and rear vehicle 5. Appropriate warning signals are passed on to the driver, in this instance, or the vehicle speed is lowered appropriately, if need be to a standstill. After the correction move shown in FIG. 1c, the vehicle is at a distance a from the front right corner. At the end of the parking process, the final distance of the front right end of vehicle 1 from lateral limitation 6 is characterized by distance b. Distance b characterizes an acceptable distance such that the vehicle does not extend from parking space 3 into the roadway.

FIGS. 2a through 2e visualize the same parking process of a vehicle 1 in a parking space 3 between two vehicles 4 and 5. Here too, vehicle 1 pursues the course of parking trajectory 2. After the first forward move, vehicle 1, however, has a distance c from lateral limitation 6, which is greater than distance a in FIG. 1c. The difference is shown as distance d. That vehicle 1 continues to extend into the street is caused by the fact that, for the first forward move, that is, in this case, the appropriate first correction move, the wheels are not able to be set to a maximum steering angle. Because of the lesser steering angle, the vehicle travels farther out of parking space 3 than in the optimal case shown in FIGS. 1b and 1c. Whereas in FIG. 1b a steering angle R for achieving maximum steering angle V is effectively selectable using an adjusted steering wheel angle $W_{max}$, in FIG. 2b the case is shown where maximum steering angle V is not achievable via maximum achievable steering wheel angle $W_{max}$, but rather a steering angle R is achieved that is smaller than V. This is caused by the momentarily prevailing conditions, such as too great a friction or a battery that is too weak.

In FIG. 2d it is shown that again a steering angle W is selected which leads to a maximum steering angle V. In FIGS. 2b and 2d, steering angle direction E is shown by arrows. In FIGS. 2b, 2c and 2e as well, the initial position of vehicle 1 is shown by dashed lines. In response to selected maximum steering angle and achieved maximum steering angle at wheels 7, vehicle 1 now does not travel far enough into parking space 3, as shown in FIG. 2e, so that distance e is greater than b. Now the vehicle protrudes into the roadway, beyond parking space 3, past vehicles 4 and 5.

Figure 3C:
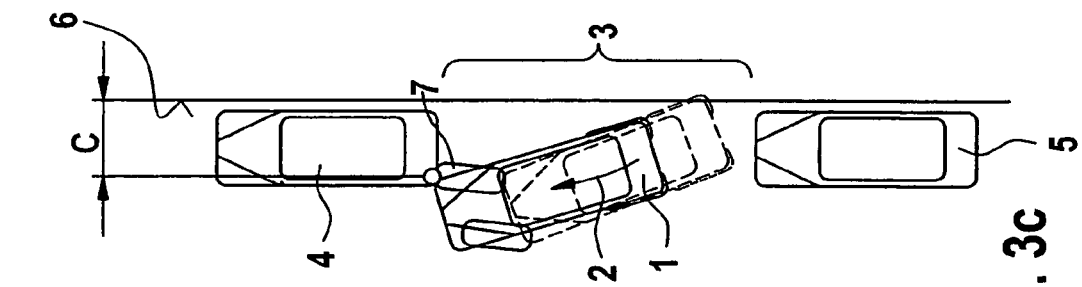
Figure 3B:
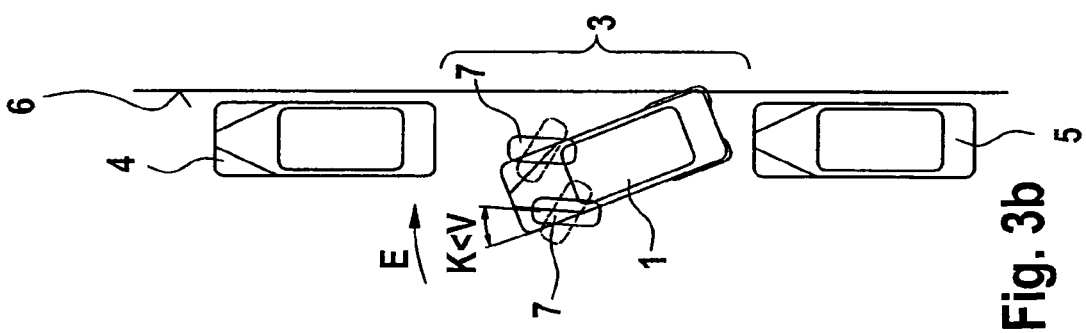
Figure 3A:
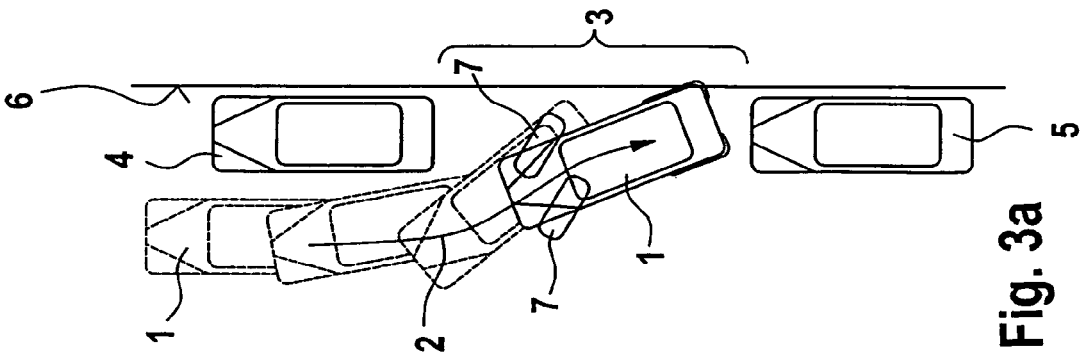
Figure 3G:
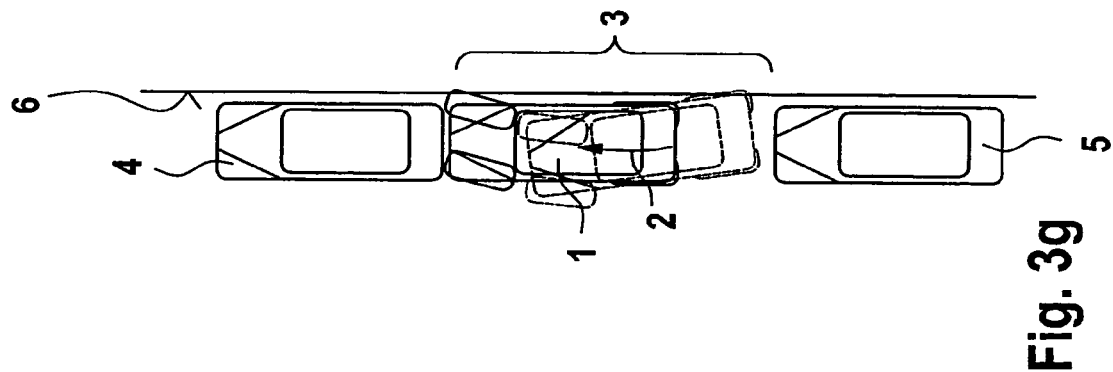
Figure 3F:
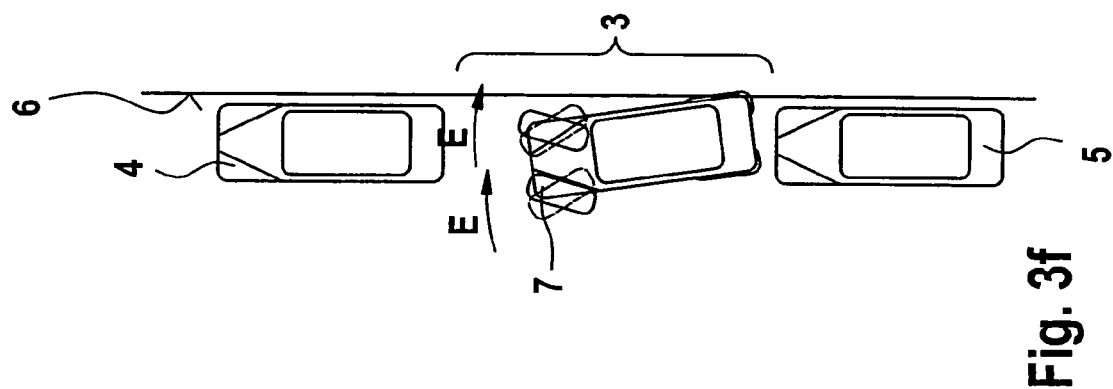

This is where an example embodiment of the present invention comes in, as is shown in FIGS. 3a to 3g. Here too, vehicle 1 follows a drive-in trajectory 2 into parking space 3, between vehicle 4 and vehicle 5. In addition, a last forward correction move is made, as shown in FIGS. 3f and 3g. In FIG. 3a, vehicle 1 sets into parking space 3, which is bordered by the two vehicles 4 and 5, using a backwards move. When it has arrived in parking space 3, the vehicle stops and tries to align wheels 7 to the right, using a maximum steering angle V which, however, is not successful. A value ascertainment device 8 registers that steering wheel angle W is achievable only to the extent of a value of a maximum achievable steering wheel angle $W_{max}$. The value ascertainment device obtains this information by the maximum steering angle being measured that the steering system attains within a specified time. The maximum achievable steering wheel angle $W_{max}$ is ascertained from this. It is detected, for instance, by the fact that, after three seconds, maximum steering angle V has still not been attained. Alternatively or in addition, the value ascertainment device is designed so that it is in a position to ascertain whether, and to what extent, steering angle R oscillates. In this context, it is developed so that it is able to use and evaluate a frequency analysis. With the aid of certain characteristics, such as the oscillation of steering angle R in a predetermined frequency range and having a certain amplitude, it is then detectable, in a computing unit 9, which is a part of a control device 10, whether steering device 11 has problems in attaining the setpoint angle, and a measure is ascertainable as to how high in value the maximum achievable steering wheel angle $W_{max}$ is selectable. In addition or alternatively it is also possible that the maximum available steering support of the steering device is able to be sampled, whereby steering wheel angle W may then be derived. The maximum available steering support force and/or the maximum available steering support power is able to be ascertained, in this context, and is able to be used further in computing device 9. Computing device 9 is a part of control device 10, which outputs an output value to steering device 11 for the alignment of wheels 7. Present steering angle R and/or maximum achievable steering angle $R_{max}$ is passed on to computing device 9 via a base data transmission device 12.

In the case in which maximum achievable steering angle $R_{max}$ is ascertained as a function of time, if there are problems present, the overall system, especially computing device 9, reduces the setpoint angle to steering wheel angle W, which vehicle 1 had already attained after two seconds. This means that wheels 7, in the last analysis, are aligned to reduced steering wheel angle W, and thus to steering angle R that is identical to it. This is shown in FIG. 3b. Thereafter, the vehicle is driven forward as far as possible, which is shown in FIG. 3c.

The distance c between the front right corner of vehicle 1 and a lateral limitation 6 that comes about is designated as c, and is greater than a in FIG. 1c, and is approximately as great as distance c in FIG. 2c.

Figure 3E:
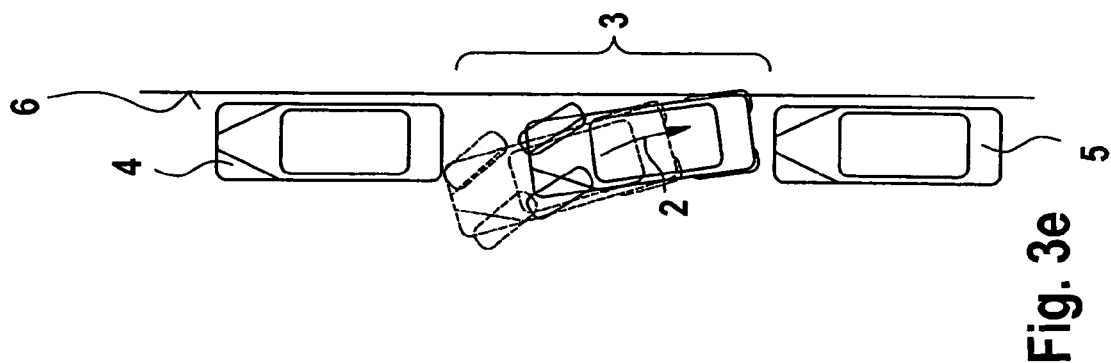

Vehicle 1 stops at this point, the wheels being realigned at the same angle as in the preceding move, in the opposite direction according to arrow E (see FIG. 3c). This is depicted in FIG. 3d. The same angle as in FIG. 3b is present on the inside. Steering wheel angle W, that was utilized in the first correction move, is now also present for the subsequent second correction move (see FIG. 3b). Because of that, the previously determined error becomes symmetrical and evens out. Vehicle 1 is now able to be driven into parking space 3 deeper than in case 2e, as is shown in FIG. 3e. To be sure, vehicle 1 is still standing slightly slantwise, but it has been driven very deep into parking space 3 again, since the problem that was determined has been handled symmetrically. This means that vehicle 1 is again driven too deep into parking space 3 by practically the same amount as it was previously driven out of parking space 3.

In FIG. 3f, a final forward move is now prepared, for which the wheels are steered to the right at a required angle, in the present case at steering wheel angle W.

FIG. 3g shows parked vehicle 1 in the final state. The distance of vehicle 1 from lateral limitation 6 is characterized as a distance a, as in FIG. 1e. Distance a has a similar magnitude as in FIG. 1g and demonstrates an acceptable end result. Vehicle 2 does not protrude into the roadway beyond parking space 3, which is to be desired.

In FIGS. 3c, 3e, 3f and 3g, the respective positions in the initial state of vehicle 2 are also shown before the carrying out of the shifting along trajectory 2, using dashed lines.

The same reference numerals are used for the same elements in the individual figures.

Figure 4:
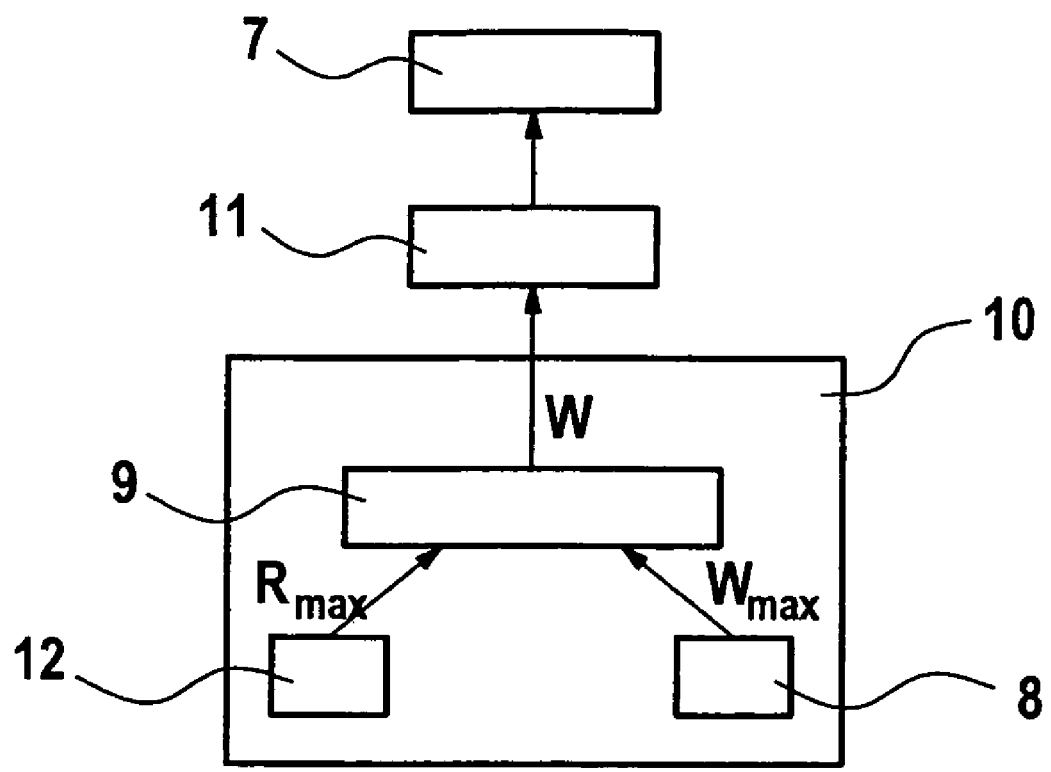
FIG. 4 shows a schematic block diagram of an example embodiment of the present invention.

FIG. 4 shows the schematic design of the device according to the present invention, in a block diagram. Control device 10 has computing unit 9, base data transmission device 12 and value ascertainment device 8.

Base data transmission device 12 supplies the value for maximum achievable steering angle $R_{max}$ to computing device 9. Value ascertainment device 8 ascertains maximum achievable steering wheel angle $W_{max}$, and sends this to computing device 9. Value ascertainment device 8 ascertains maximum achievable steering wheel angle $W_{max}$ via an extrapolation of a measured steering wheel angle W as a function of time, and/or via an analysis of the oscillation of steering wheel angle W and extrapolation with respect to a maximum achievable steering wheel angle $W_{max}$ and/or via an analysis of the available force and/or power at steering device 11. Steering device 11 receives the value to be steered for steering wheel angle W as the output value from computing device 9.

Steering device 11 includes an electric motor that applies a steering torque to wheels 7, in this context. Because of this, wheels 7 are deflected in a direction, according to arrow E, shown, for instance, in FIGS. 3b and 3d, that is, the steering direction. Attained steering angle R then corresponds to set steering wheel angle W, and is not greater than $W_{max}$.

During the ascertainment of the value of steering wheel angle W that was passed on to steering device 11, computing device 9 deducts a safety angle S which is of an order of magnitude of 50°, in order to take into account that, in response to changes in the vehicle's position, there are greater frictional forces between wheels 7 and the pavement, and setting steering wheel angle W to the same value as in the preceding correction move is then not possible. This ensures that, even in response to the improvement of the friction between wheels 7 and the pavement, the maximum achievable steering wheel angle $W_{max}$ is still achievable at wheels 7 in the form of maximum achievable steering angle $R_{max}=W_{max}$. The limitation of the steering angle is implemented by using mechanical blocking.

One adapted method makes use of the steering angle instead of the steering wheel angle, and vice versa.

What is claimed is:

1. A device for semiautonomous support of a parking process of a vehicle, comprising:
   a steering device for steering movement of wheels of the vehicle; and
   a control device adapted to control the steering device, the control device including a computing device adapted to process input values to form an output value that controls the steering device;
   wherein the computing device is adapted to process a steering angle, that is actually maximally achievable at the wheels of the vehicle, together with a steering wheel angle that is maximally achievable in response to respective conditions, to form the output value, the output value being designated as a steering wheel angle and being suppliable to the steering device.

2. The device as recited in claim 1, wherein the control device is adapted to output the output value to the steering device for setting the wheels in a first correction move and a subsequent second correction move so as to have a same steering wheel angle and to have a same maximally achievable steering wheel angle.

3. A device for semiautonomous support of a parking process of a vehicle, comprising:
   a steering device for steering movement of wheels of the vehicle; and
   a control device adapted to control the steering device, the control device including a computing device adapted to process input values to form an output value that controls the steering device;
   wherein the computing device is adapted to process a steering angle, that is maximally achievable at the wheels of the vehicle, together with a steering wheel angle that is maximally achievable in response to respective conditions, to form the output value, the output value being designated as a steering wheel angle and being suppliable to the steering device, and
   wherein the control device includes a base data transmission device that supplies a value of the maximally achievable steering angle.

4. The device as recited in claim 3, wherein the computing device is adapted to establish the maximal achievable steering wheel angle after subtraction of a safety angle from the maximal achievable steering wheel angle.

5. A device for semiautonomous support of a parking process of a vehicle, comprising:
   a steering device for steering movement of wheels of the vehicle; and
   a control device adapted to control the steering device, the control device including a computing device adapted to process input values to form an output value that controls the steering device;
   wherein the computing device is adapted to process a steering angle, that is maximally achievable at the wheels of the vehicle, together with a steering wheel angle that is maximally achievable in response to respective conditions, to form the output value, the output value being designated as a steering wheel angle and being suppliable to the steering device, and
   wherein the control device includes a value ascertainment device that supplies the maximally achievable steering wheel angle.

6. The device as recited in claim 5, wherein the value ascertainment device is adapted to extrapolate the maximally achievable steering wheel angle based on a steering wheel angle attained within a certain time.

7. The device as recited in claim 5, wherein the value ascertainment device is adapted to determine the maximally achievable steering wheel angle based on oscillation behavior of the steering wheel angle.

8. The device as recited in claim 5, wherein the value ascertainment device is adapted to determine the maximally achievable steering wheel angle based on at least one of a maximum available steering support force, and steering support power that are able to be supplied to the steering device.

9. The device as recited in claim 5, wherein the control device is adapted to set a steering wheel angle at the steering system during a third correction move, the steering wheel angle having a value that is less than or equal to the maximal achievable steering wheel angle.

10. A device for semiautonomous support of a parking process of a vehicle, comprising:
    a steering device for steering movement of wheels of the vehicle; and
    a control device adapted to control the steering device, the control device including a computing device adapted to process input values to form an output value that controls the steering device;
    wherein the computing device is adapted to process a steering angle, that is maximally achievable at the wheels of the vehicle, together with a steering wheel angle that is maximally achievable in response to respective conditions, to form the output value, the output value being designated as a steering wheel angle and being suppliable to the steering device, and
    wherein the control device is adapted to establish a number of moves as a function of a deviation of the maximal achievable steering wheel angle from the maximal achievable steering angle.

11. A method for the semiautonomous support of the parking process of a vehicle, comprising:
    carrying out a steering movement of the wheels of the vehicle using a steering device;
    controlling the steering device using a control device; and
    processing, by a computing device, a steering angle that is actually maximally achievable at the wheels of the vehicle and a steering angle that is maximally achievable in response to a respective condition, in such a way that an output value designated as a steering wheel angle is output to the steering device for controlling the steering device.

* * * * *